Feb. 18, 1947. G. HALLEWELL 2,416,005
DYNAMO ELECTRIC MACHINERY AND PRIME MOVERS THEREFOR
Filed Aug. 24, 1944 3 Sheets-Sheet 3

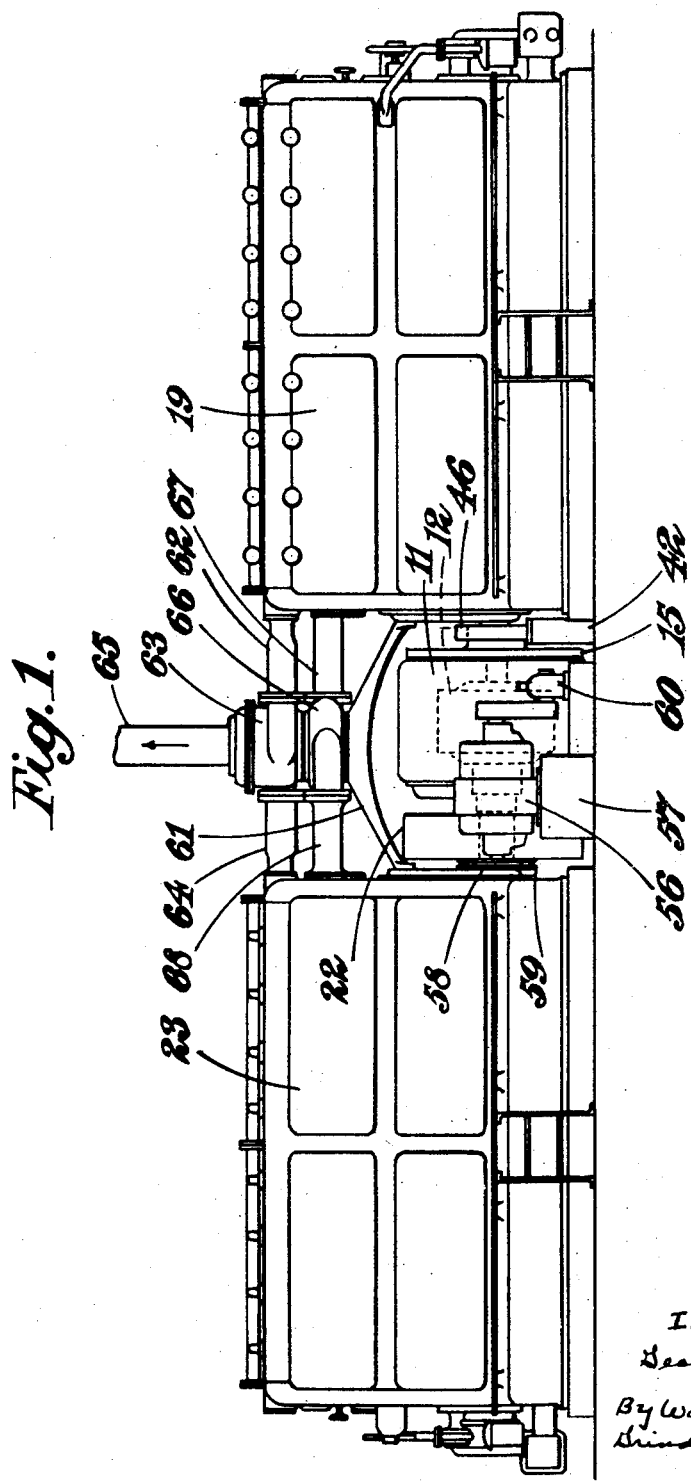

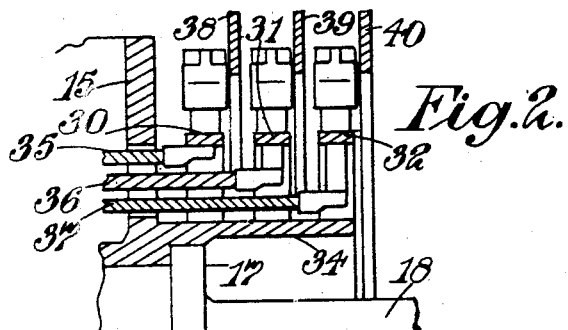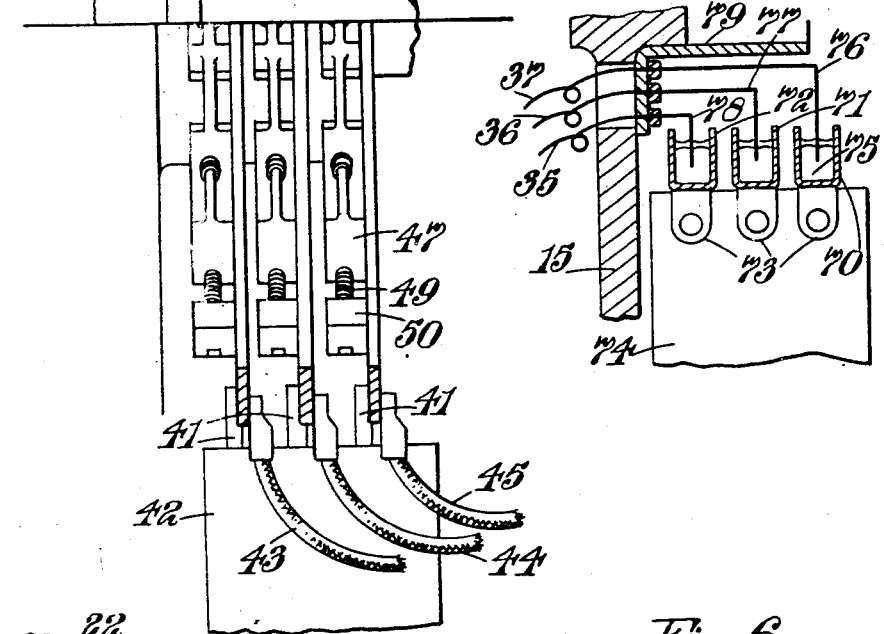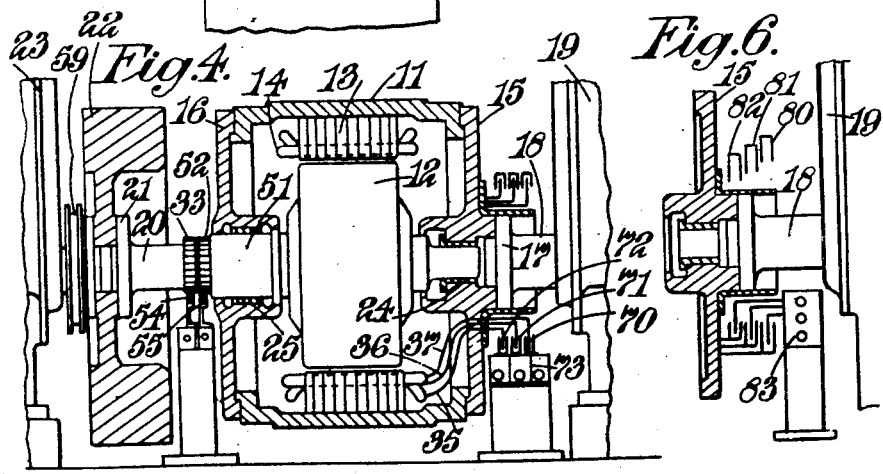

Patented Feb. 18, 1947

2,416,005

UNITED STATES PATENT OFFICE 2,416,005

DYNAMOELECTRIC MACHINERY AND PRIME MOVERS THEREFOR

George Hallewell, Stamford, England, assignor to Blackstone & Company Limited, Stamford, England, a British company Application August 24, 1944, Serial No. 550,981
In Great Britain February 16, 1944

1 Claim. (Cl. 290—4)

This invention comprises improvements in or relating to dynamoelectric machinery and prime movers therefor.

It is an object of the invention to provide an electrical generating set which is capable of greater output for a given weight than is the case with sets as heretofore constructed.

It is well known that if the speed of an electric generator could be increased its output would be increased but a limit is set on the increase of output in this way by the action of centrifugal force which increases beyond the permissible limit at speeds above those which are normal.

According to the present invention an electric generator is constructed so that both the field magnets and the armature are capable of rotation and means are provided to drive the field magnets in one direction and the armature in the opposite direction thereby increasing the relative speed of these two parts without increasing the absolute velocity above that which is permitted by considerations of centrifugal force.

A generator in accordance with the invention may be either a direct current generator or an alternator but will be hereinafter described in its application to an alternator.

The invention includes an electric generating set comprising in combination a rotatably mounted field magnet system, a rotatably mounted armature therefor, the field magnet system having a driving shaft at one end of the generator and the armature at the other end and two separate prime movers coupled the one to the magnet system and the other to the armature so as to drive them in opposite directions.

Conveniently the two prime movers are direct-coupled to the two shafts so that one stands at one end of the generator and the other at the other end thereof, in line with each other.

The invention further comprises arrangements for the collection of current from the rotating armature and a convenient means of providing for a joint turbo-charger for the two engines in the case where these are internal-combustion engines disposed end to end as just described.

The following is a description, by way of example of one convenient form of generating set in accordance with the invention and of various forms of current collecting devices for use on the generator.

In the accompanying drawings:

Figure 1 is an elevation of a generating set in accordance with the invention;

Figure 2 is a detail, partly in side elevation and partly in longitudinal section, of slip ring arrangements for use in conjunction therewith;

Figure 4 is a longitudinal section through the generator and adjacent parts of the prime movers; this figure also shows an alternative method of current collection;

Figures 5 and 6 are details of further alternative methods of current collection.

Figure 3:
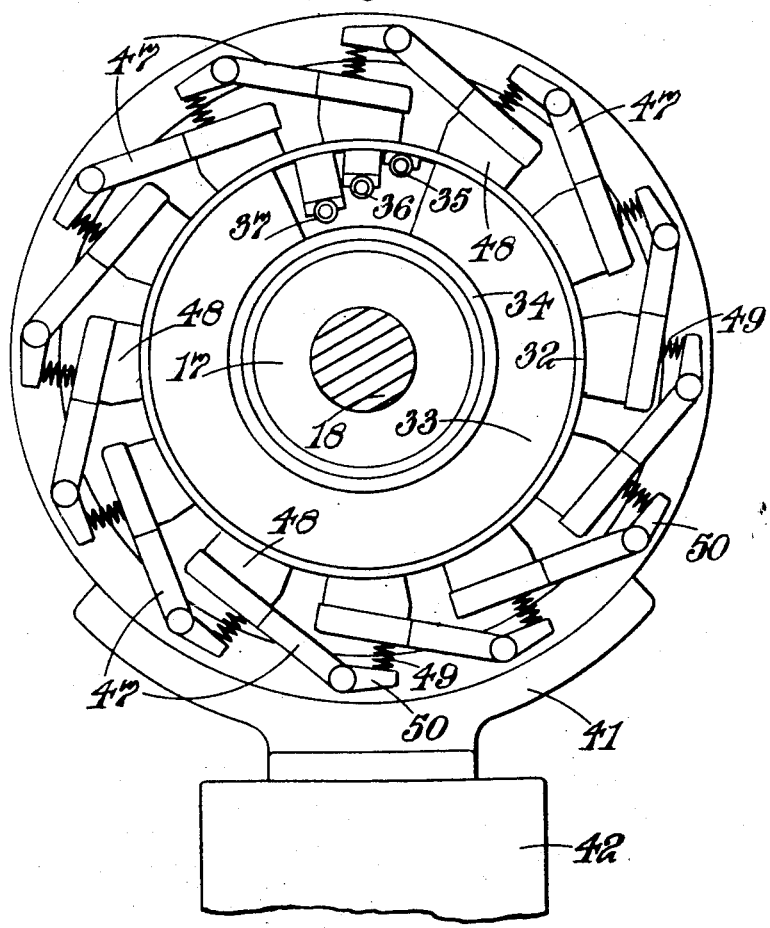
Figure 3 is an end elevation of the parts shown in Figure 2.

Referring to Figure 1, this shows a generator consisting of an external rotatable armature or generating member 11 mounted to rotate outside field magnets 12, shown in dotted lines. (The term "armature" is employed in the present specification in its broad sense as including all forms of generating winding whether external, as in the usual alternating current generator, or internal, and whether alternating or direct current is drawn therefrom. In the instance now being described the armature is an alternating current external armature.)

The armature can best be seen in the sectional view, Figure 4, which although it differs in details as to current collection is in other respects similar to Figure 1 and the parts comprise an iron external casing (to which the numeral 11, referring to the armature portion broadly, is affixed in the figures) a laminated core portion 13 and a 3-phase winding 14. End plates 15, 16 are provided and the end plate 15 is bolted to a driving flange 17 on a shaft 18 of a prime mover 19. The casing of the armature 11 and the laminated core 13 serve as a fly-wheel for the engine 19.

The field magnet 12 is mounted on a shaft 20 having a flange 21 which is bolted to a fly-wheel 22 of a second internal-combustion engine 23 disposed on the opposite side of the generator 11, 12 to the engine 19 and having its crankshaft which carries the fly-wheel 22 in line with the crankshaft 18 of the engine 19. The field-magnet shaft 20 extends at its other end from the flange 21 into a bush 24 in the end plate 15, which bush is located close to the flange 17 of the crankshaft 18 and thus the field magnet 12 is supported not only by the crankshaft of its own engine but also by the bush 24 which provides a journal bearing close to the crankshaft 18 of the other engine.

The end plate 16 of the rotating armature contains a journal bearing 25 which bears on the shaft 20 and so the rotating armature is supported not only by the crankshaft 18 but also by its bearing on the shaft 20 connected to the other engine.

The two engines drive the magnet 12 in one direction and the armature 11 in the other direction so that the relative speed of the field winding and the armature is doubled as compared with what it would be by either engine driving alone.

As the machine is an alternator and the speed is doubled in the manner described, in order to keep the frequency of the alternating current at the proper value the number of field magnet poles must be only half that which would be required if the outer element were stationary as in usual practice. Moreover it is necessary that arrangement should be made not only to convey current to the rotating field magnets but also to draw off the electrical output from the rotating armature.

To this end slip-rings 30, 31, 32 are provided (see Figures 2 and 3) but are insulated from one another by being mounted on insulating discs 33 carried on a cylindrical projection 34 from the end plate 15. Each of the slip-rings is connected by a lead to one of the phases of the armature winding, the three leads being shown in Figures 2 and 3 and numbered 35, 36, 37. Of a larger radius than the slip-rings and to one side of the plane of each of them there is located, concentrically with the slip-rings, one of a set of fixed collector rings 38, 39, 40. The collector rings are supported at the bottom by terminal brackets 41 mounted on an insulating base 42 and the rings are each connected to a lead-off wire 43, 44 or 45, as the case may be. In Figure 1 the insulating base is indicated at 42 and the slip-ring assembly, which is too small to show in detail in this figure, is indicated in a general way by the rectangle 46.

To each of the rings 38 to 40 there are pivoted a series of brush holder arms 47 (Figure 3) which carry carbon brushes 48 bearing on the slip ring adjacent (32 in Figure 3). The brush holder arms are urged in a direction to press the brushes on the slip-rings by springs 49 which press on the arms behind the brushes and find their seating in tail-levers 50 carried by the arms 47. In this way a large brush area is provided for each slip-ring and heavy currents, such as are generated by the rotating armature, can be collected without overheating.

At the opposite end of the generator the field winding 12 is connected by copper leads which pass through an enlarged part 51 of the shaft 20 to two slip-rings 52, 53 (Figure 4). The brushes 54, 55 bear on the slip-rings and leads, not shown in the drawing, extend from the slip-rings to an exciter generator 56 mounted on a base 57 beside the main generator and driven by a pulley 58 and a V belt from a pulley 59 on the shaft of the engine 23. A voltage regulator 60 may be provided, if desired, for the exciter 56.

Between the two engines 19, 20 there is an arch-shaped casting 61 which supports a turbo-charger. The exhaust pipe 62 of the engine 19 is led into one side of a turbine casing 63 and the similar exhaust pipe 64 of the other engine is led into the opposite side of the same casing, the exhaust gases of the two engines operating a single turbine, after which the gases pass away by the final exhaust pipe 65. The turbine 63 drives a supercharger 66 which delivers air under pressure through pipes 67 and 68 to the inlet manifolds of the two engines respectively.

The engines as illustrated are intended to represent injection-ignition or Diesel type engines, but it is to be understood that if other internal-combustion engines were used they might be similarly supercharged if desired.

In Figures 4 and 5 there is illustrated an alternative form of current-collecting means for the generator. According to these figures, rings of U-section, numbered 70, 71, 72 are disposed concentrically with the shaft 18 and connected to three terminal blocks 73, supported on an insulating base 74. The lower part of the rings is filled with mercury 75 (Figure 5) and into the mercury dip three insulated rotatable discs 76, 77, 78 which are connected to the leads 35, 36, 37 before referred to passing through the end plate 15. The discs are only shown diagrammatically in the drawing and would, of course, be rigidly supported and insulated from the frame of the machine. The support may include a sleeve 79 bolted to the plate 15 and concentric therewith. On the surface of the mercury 75 in the rings 70 to 72 there floats a layer of oil in order to prevent oxidation and connection is made with the rotatable conductors by the discs dipping in the mercury.

The construction shown in Figure 6 differs in that the U-shaped rings 80, 81, 82 rotate with the shaft 18, being supported by the end plate 15 and the fixed conductors which dip into the mercury are carried by a fixed terminal block 83.

If instead of providing an alternating current generator it is desired that the generator 11, 12 should be a direct current machine, it is necessary that a commutator be associated with the armature and rotating brushes be carried by the field magnets. The leads from the brushes would extend to two slip-rings mounted to rotate with the field magnets, from which the current would be collected by means of brushes or mercury cups. This applies whether the armature is internal or external.

I claim:

An electric generating set comprising in combination a rotatably mounted field magnet system, a rotatably mounted armature therefor, the field magnet system having a driving member at one end of the generator and the armature a driving member at the other end, two separate internal combustion engines coupled one to the magnet system and the other to the armature so as to drive them in opposite directions, and a joint turbo-charger for the two engines located between and operated jointly by the exhausts of the two engines.

GEORGE HALLEWELL.

REFERENCES CITED

The following references are of record in the file of this patent:

UNITED STATES PATENTS

| Number | Name | Date |
| --- | --- | --- |
| 1,402,875 | McCallister | Jan. 10, 1922 |
| 1,453,858 | Schmidt | May 1, 1923 |
| 2,093,077 | Fraser | Sept. 14, 1937 |
| 2,137,738 | Faubion | Nov. 22, 1938 |